US012283678B2

(12) United States Patent
Lee et al.

(10) Patent No.: US 12,283,678 B2
(45) Date of Patent: Apr. 22, 2025

(54) BATTERY MODULE AND BATTERY PACK INCLUDING THE SAME

(71) Applicant: LG ENERGY SOLUTION, LTD., Seoul (KR)

(72) Inventors: Changhun Lee, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 639 days.

(21) Appl. No.: 17/617,250

(22) PCT Filed: Mar. 11, 2021

(86) PCT No.: PCT/KR2021/003038
§ 371 (c)(1),
(2) Date: Dec. 7, 2021

(87) PCT Pub. No.: WO2021/221307
PCT Pub. Date: Nov. 4, 2021

(65) Prior Publication Data
US 2022/0247009 A1 Aug. 4, 2022

(30) Foreign Application Priority Data
Apr. 29, 2020 (KR) .................. 10-2020-0052256

(51) Int. Cl.
*H01M 10/6556* (2014.01)
*H01M 10/647* (2014.01)
(Continued)

(52) U.S. Cl.
CPC ..... *H01M 10/6556* (2015.04); *H01M 10/647* (2015.04); *H01M 50/211* (2021.01); *H01M 10/613* (2015.04)

(58) Field of Classification Search
CPC .......... H01M 10/6556; H01M 10/647; H01M 50/211; H01M 10/613
See application file for complete search history.

(56) References Cited

U.S. PATENT DOCUMENTS

2013/0224541 A1* 8/2013 Nam .................... H01M 50/211
429/90
2014/0023906 A1 1/2014 Hashimoto et al.
(Continued)

FOREIGN PATENT DOCUMENTS

CN        209747688 U    12/2018
CN        104321925 A    12/2024
(Continued)

OTHER PUBLICATIONS

KR20180038310 MT (Year: 2018).*
(Continued)

*Primary Examiner* — Alexander Usyatinsky
(74) *Attorney, Agent, or Firm* — Birch, Stewart, Kolasch & Birch, LLP (57) ABSTRACT

A battery module includes a battery cell stack in which a plurality of battery cells are stacked, a module frame for housing the battery cell stack, a thermal conductive resin layer located between a bottom portion of the module frame and the battery cell stack, and a heat sink located below a bottom portion of the module frame. The bottom portion of the module frame has an upper plate of the heat sink, and an avoidance portion for exposing one end of the bottom portion of the module frame is formed at one end of the heat sink.

15 Claims, 7 Drawing Sheets

(51) Int. Cl.
   *H01M 50/211*   (2021.01)
   *H01M 10/613*   (2014.01)

(56) References Cited

U.S. PATENT DOCUMENTS

| | | | |
|---|---|---|---|
| 2015/0086831 A1 | 3/2015 | Haussmann | |
| 2015/0325889 A1* | 11/2015 | Jung | F28F 3/12 |
| | | | 165/185 |
| 2016/0164148 A1* | 6/2016 | Yum | H01M 10/6551 |
| | | | 429/120 |
| 2019/0077276 A1 | 3/2019 | Capati et al. | |
| 2020/0067040 A1* | 2/2020 | Kim | H01M 50/211 |
| 2020/0328484 A1 | 10/2020 | Einoegg et al. | |
| 2020/0373634 A1 | 11/2020 | Choi | |
| 2021/0020879 A1 | 1/2021 | Lee | |

FOREIGN PATENT DOCUMENTS

| | | | |
|---|---|---|---|
| DE | 10 2017 222 771 A1 | | 6/2019 |
| DE | 10 2018 203 920 A1 | | 9/2019 |
| JP | 2015-225703 A | | 12/2015 |
| JP | 2015225703 | * | 12/2015 |
| JP | 6497314 B2 | | 4/2019 |
| JP | 2021-504893 A | | 2/2021 |
| KR | 10-1285712 B1 | | 7/2013 |
| KR | 10-2015-0045378 A | | 4/2015 |
| KR | 10-2016-0067711 A | | 6/2016 |
| KR | 10-2017-0019041 A | | 2/2017 |
| KR | 10-2017-0107798 A | | 9/2017 |
| KR | 10-2018-0038310 A | | 4/2018 |
| KR | 20180038310 | * | 4/2018 |
| KR | 10-2082384 B1 | | 2/2020 |
| KR | 10-2020-0030966 A | | 3/2020 |
| WO | WO 2012/133708 A1 | | 10/2012 |
| WO | WO 2020/022643 A1 | | 1/2020 |

OTHER PUBLICATIONS

JP2015225703 MT (Year: 2015).*
The decision of JPO to grant a Patent for Application No. 2021571608 (Year: 2022).*
The Notification of SIPO to grant a Patent for Application No. 202180003567 (Year: 2023).*
International Search Report for PCT/KR2021/003038 (PCT/ISA/210) mailed on Jul. 1, 2021.
Extended European Search Report for European Application No. 21797573.9, dated Aug. 30, 2022.

* cited by examiner

【FIG. 1】

Prior Art

[FIG. 2]

Prior Art

BATTERY MODULE AND BATTERY PACK INCLUDING THE SAME

CROSS CITATION WITH RELATED APPLICATION(S)

This application claims the benefit of Korean Patent Application No. 10-2020-0052256 filed on Apr. 29, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module having improved cooling performance, and a battery pack including the same.

BACKGROUND ART

In modern society, as portable devices such as a mobile phone, a notebook computer, a camcorder and a digital camera has been daily used, the development of technologies in the fields related to portable devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and a battery case that seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch made of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules may be mounted together with various control and protection systems such as BMS (battery management system) and a cooling system to form a battery pack.

When the temperature of the secondary battery rises higher than an appropriate temperature, the performance of the secondary battery may be deteriorated, and in the worst case, there is also a risk of an explosion or ignition. In particular, a large number of secondary batteries, that is, a battery module or a battery pack having battery cells, can add up the heat generated from the large number of battery cells in a narrow space, so that the temperature can rise more quickly and severely. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a middle or large-sized battery module contained in a vehicle battery pack, it is frequently exposed to direct sunlight and can be subjected to high-temperature conditions such as summer or desert areas.

Therefore, when a battery module or a battery pack is configured, it may be very important to stably and effectively ensure the cooling performance.

Figure 1:
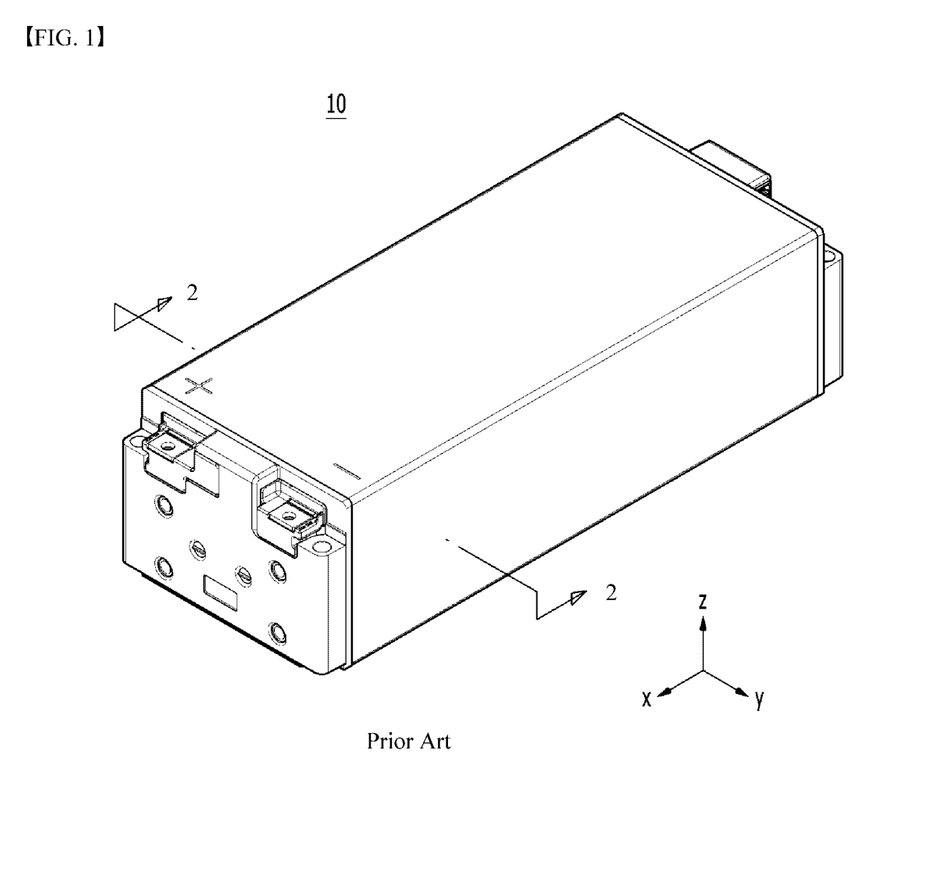
FIG. 1 shows a part of a perspective view of a conventional battery module.
Figure 2:
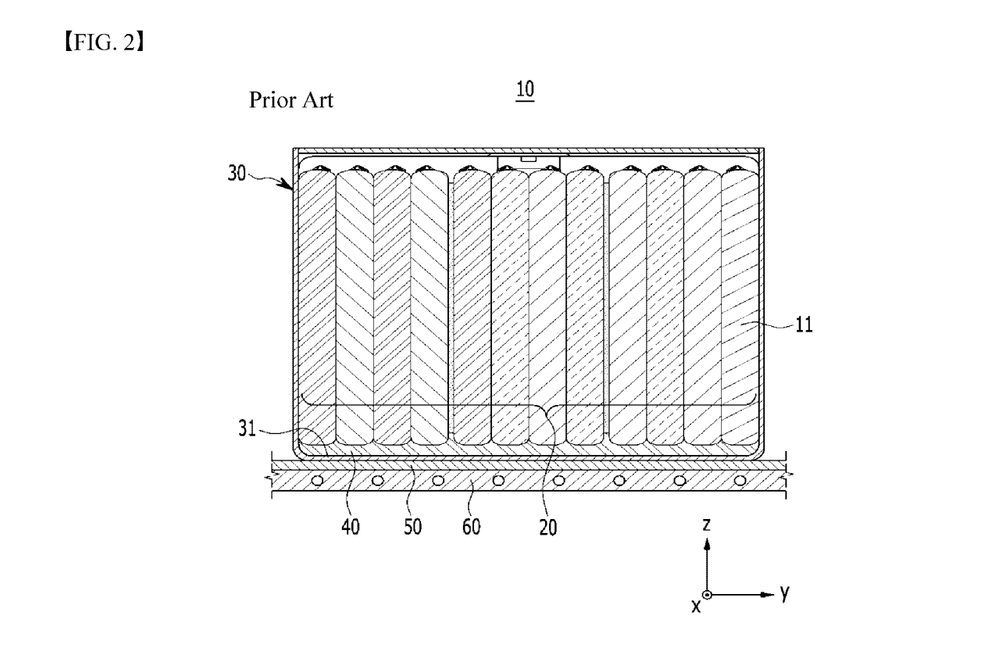
FIG. 2 is a cross-sectional view taken along the yz plane on the basis of the cutting line 2-2 of FIG. 1.

FIG. 1 is a perspective view of a conventional battery module. FIG. 2 is a cross-sectional view taken along the cutting line 2-2 of FIG. 1. In particular, FIG. 2 additionally shows a heat transfer member and a heat sink located under the battery module.

Referring to FIGS. 1 and 2, the conventional battery module 10 is configured such that a plurality of battery cells 11 are stacked to form a battery cell stack 20, and the battery cell stack 20 is housed in the module frame 30.

As described above, since the battery module 10 includes a plurality of battery cells 11, it generates a large amount of heat in a charge and discharge process. As a cooling means, the battery module 10 may include a thermal conductive resin layer 40 that is located between the battery cell stack 20 and the bottom portion 31 of the module frame 30. In addition, when the battery module 10 is mounted on the pack frame to form a battery pack, a heat transfer member 50 and a heat sink 60 may be sequentially located under the battery module 10. The heat transfer member 50 may be a heat dissipation pad, and the heat sink 60 may have a refrigerant flow passage formed therein.

The heat generated from the battery cell 11 passes through the thermal conductive resin layer 40, the bottom portion 31 of the module frame 30, the heat transfer member 50, and the heat sink 60 in this order, and then is transmitted to the outside.

By the way, in the case of the conventional battery module 10, the heat transfer path is complicated as described above and thus, it is difficult to effectively transfer the heat generated from the battery cell 11. The module frame 30 itself may deteriorate heat transfer properties, and a fine air layer such as an air gap, which can be formed in the space between the module frame 30, the heat transfer member 50, and the heat sink 60, respectively, may also be a factor that deteriorates the heat transfer properties.

As for the battery module, since other demands such as downsizing of module and an increase in capacity are also continuing, it can be said that it is practically necessary to develop a battery module capable of satisfying these various requirements while improving the cooling performance.

DETAILED DESCRIPTION OF THE INVENTION

Technical Problem

It is an object of the present disclosure to provide a battery module having improved cooling performance, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked in a stacking direction, a module frame for housing the battery cell stack, the module frame including a bottom portion, a thermal conductive resin layer located between the bottom portion of the module frame and the battery cell stack, and a heat sink located below the bottom portion of the module frame, wherein the bottom portion of the module frame forms an upper plate attached to the heat sink, and wherein an avoidance portion for exposing one end of the bottom portion of the module frame is formed at one end of the heat sink.

Based on a direction perpendicular to the stacking direction of the plurality of battery cells, one end of the heat sink that coincides with the boundary of the avoidance portion may be disposed on a same line as an end of the thermal conductive resin layer or inside the thermal conductive resin layer.

A recessed portion of the heat sink and the bottom portion of the module frame may form a refrigerant flow passage, and the bottom portion of the module frame may contacts a refrigerant flowing in the refrigerant flow passage.

In the avoidance portion, one end of the heat sink and one end of the bottom portion of the module frame may be joined by welding, and a welding line may be formed by weld-joining in the stacking direction of the battery cells.

The module frame may include a module frame protrusion portion formed by protruding a part of the bottom portion of the module frame.

The heat sink may include a heat sink protrusion portion that protrudes from one side of the heat sink to a portion where the module frame protrusion portion is located.

The battery module may include a first end plate for covering the front surface of the battery cell stack and a second end plate for covering the rear surface of the battery cell stack, and the module frame protrusion portion may be extended and formed so as to pass through the first end plate.

The module frame protrusion portion may include a first module frame protrusion portion and a second module frame protrusion portion that are located so as to be separated from each other at one side of the module frame, and the avoidance portion may be formed between the first module frame protrusion portion and the second module frame protrusion portion.

The avoidance portion for exposing one end of the bottom portion of the module frame may be formed between the first end plate and one end of the heat sink.

The module frame may include a lower frame that covers a lower portion and both side portions of the battery cell stack, and an upper plate that covers an upper portion of the battery cell stack, the lower frame may include a bottom portion and two side portions facing each other, the bottom portion may include a first portion and a second portion, the thermal conductive resin layer may be disposed in the first portion, the second portion may be located at the edge with respect to a longitudinal direction of the battery cell, and a thickness of the second portion may be thinner than a thickness of the first portion.

The battery module may further include a pad portion located between the first portion and the battery cell stack, and the pad portion may be located between the thermal conductive resin layer and the second portion.

A protrusion pattern protruding toward the bottom portion of the module frame may be formed inside the heat sink.

According to another embodiment of the present disclosure, there is provided a battery pack comprising the above-mentioned battery module.

Advantageous Effects

According to embodiments of the present disclosure, the cooling performance can be improved by realizing a cooling integrated type battery module, and in such a cooling integrated type battery module, the rigidity against vibration and impact can be improved through a structural deformation of the cooling plate.

In addition, by improving the rigidity, it is possible to prevent the module frame from being excessively deformed, causing refrigerant leakage and deteriorating the cooling performance.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 3:
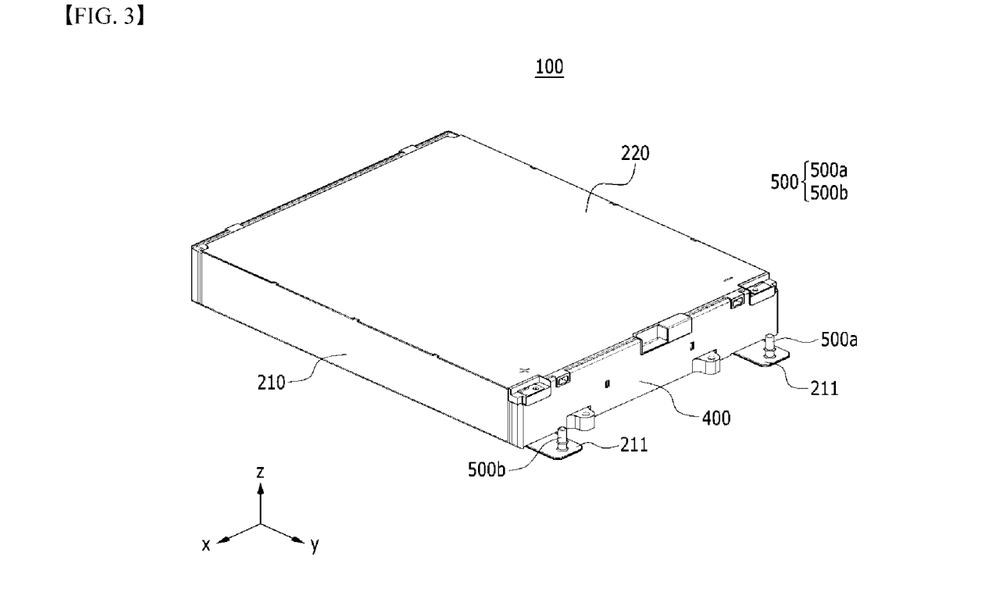
FIG. 3 is a perspective view showing a battery module according to an embodiment of the present disclosure.
Figure 4:
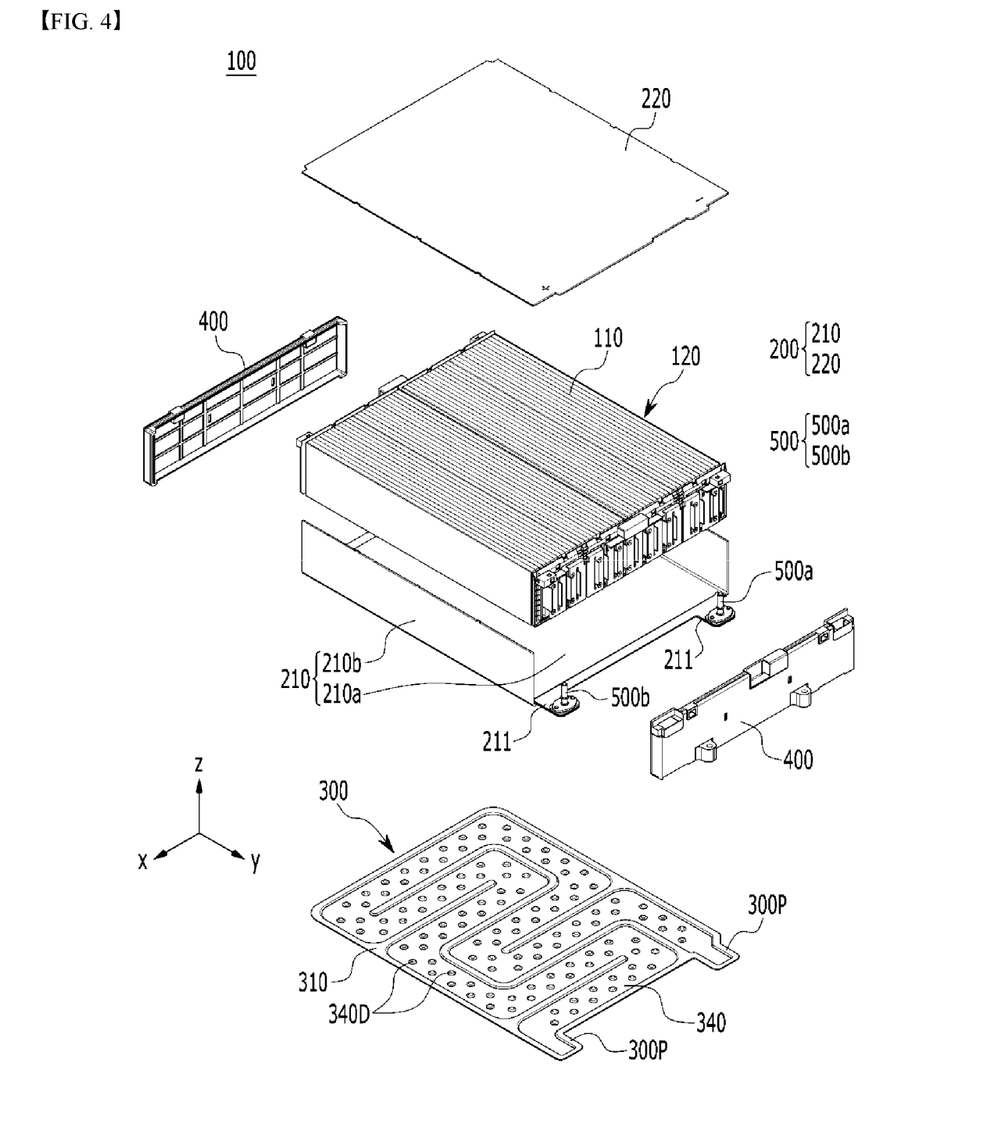
FIG. 4 is an exploded perspective view of the battery module of FIG. 3.

FIG. 3 is a perspective view showing a battery module according to an embodiment of the present disclosure. FIG. 4 is an exploded perspective view of the battery module of FIG. 3.

Referring to FIGS. 3 and 4, a battery module 100 according to embodiments of the present disclosure includes a battery cell stack 120 in which a plurality of battery cells 110 are stacked, a module frame 200 for housing the battery cell stack 120, and a cooling port 500 for cooling the battery module 100. Further, the battery module 100 may include a heat sink 300 located below the bottom portion 210a of the module frame 200, a refrigerant may be supplied to the heat sink 300 via the cooling port 500, and the refrigerant may be discharged from the heat sink 300. Specifically, the cooling port 500 includes a refrigerant injection port 500a and a refrigerant discharge port 500b that are located so as to be separated from each other, and the refrigerant injection port 500a and the refrigerant discharge port 500b may be connected to a pack refrigerant to tube (not shown).

The battery cell 110 may be a pouch-type battery cell. The pouch-type battery cell may be formed by housing an electrode assembly in a pouch case of a laminate sheet including a resin layer and a metal layer, and then heat-sealing the outer periphery of the pouch case. At this time, the battery cell 110 may be formed in a rectangular sheet-like structure.

The battery cells 110 may be composed of a plurality of cells, and the plurality of battery cells 110 are stacked so as to be electrically connected to each other, thereby forming a battery cell stack 120. In particular, as shown in FIG. 4, a plurality of battery cells 110 may be stacked along a direction parallel to the x-axis.

The module frame 200 for housing the battery cell stack 120 may include an upper plate 220 and a lower frame 210

The lower frame 210 may be a U-shaped frame, and the lower frame 210 may include a bottom portion 210a and two side portions 210b extending upward from both ends of the bottom portion 210a. The bottom portion 210a may cover a lower surface (direction opposite to the z-axis) of the battery cell stack 120, and the side portions 210b may cover both side surfaces (x-axis direction and direction opposite to the same) of the battery cell stack 120.

The upper plate 220 may be formed in a single plate-shaped structure that covers the remaining upper surface (z-axis direction) excluding the lower surface and the both side surfaces covered by the lower frame 210. The upper plate 220 and the lower frame 210 can be joined by welding or the like in a state in which the corresponding corner portions are in contact with each other, thereby forming a structure that covers the battery cell stack 120 vertically and horizontally. The battery cell stack 120 can be physically protected through the upper plate 220 and the lower frame 210. For this purpose, the upper plate 220 and the lower frame 210 may include a metal material having a predetermined strength.

Meanwhile, although not specifically shown, the module frame 200 according to modified embodiments of the present disclosure may be a mono frame in the form of a metal plate in which the upper surface, the lower surface, and both side surfaces are integrated. That is, this is not a structure in which the lower frame 210 and the upper plate 220 are joined with each other, but a to structure in which the upper surface, the lower surface, and both side surfaces are integrated by being manufactured by extrusion molding.

The end plate 400 may be located on both open sides (y-axis direction and direction opposite to the same) corresponding to each other of the module frame 200, so that it may be formed so as to cover the battery cell stack 120. The end plate 400 can physically protect the battery cell stack 120 and other electronic instruments from external impact.

Meanwhile, although not specifically shown, a busbar frame on which a busbar is mounted and an insulating cover for electrical insulation may be located between the battery cell stack 120 and the end plate 400.

The module frame 200 according to embodiments of the disclosure includes a module frame protrusion portion 211 formed so that the bottom portion 210a of the module frame 200 is extended and passes through the end plate 400. At this time, the refrigerant inflowing and discharging by the cooling port 500 connected to the upper surface of the module frame protrusion portion 211 can be supplied to the heat sink 300 via the module frame protrusion portion 211 and discharged from the heat sink 300.

Specifically, the cooling port 500 according to embodiments of the disclosure includes a refrigerant injection port 500a for supplying a refrigerant to the heat sink 300, and a refrigerant discharge port 500b for discharging the refrigerant from the heat sink 300, and the refrigerant injection port 500a and the refrigerant discharge port 500b may be respectively connected to a pack refrigerant tube (not shown). The module frame protrusion portion 211 includes a first module frame protrusion portion and a second module frame protrusion portion that are located so as to be separated from each other at one side of the module frame 200, the refrigerant injection port 500a may be disposed on the first module frame protrusion portion, and the refrigerant discharge port 500b may be disposed on the second module frame protrusion portion.

A protrusion pattern 340D may be formed in the lower plate 310 of the heat sink 300 according to embodiments of the present disclosure. In the case of a large-area battery module in which as in the battery cell stack 120 according to embodiments of the present disclosure, the number of stacked battery cells is increased significantly compared to a conventional case, the width of the refrigerant flow passage may be formed wider and thus, a temperature deviation can be more severe. In the large-area battery module, it may include a case in which approximately 32 to 48 battery cells are stacked in one battery module, compared to a conventional case in which approximately 12 to 24 battery cells are stacked in one battery module. In this case, the protrusion pattern 340D according to embodiments of the present disclosure can exhibit the effect of substantially reducing the width of the refrigerant flow passage, so that the pressure drop can be minimized and, at the same time, the temperature deviation between the widths of the refrigerant flow passage can be reduced. Therefore, a uniform cooling effect can be realized.

In the following, the heat sink according to embodiments of the present disclosure will be described in more detail with reference to FIGS. 4 and 5.

Figure 5:
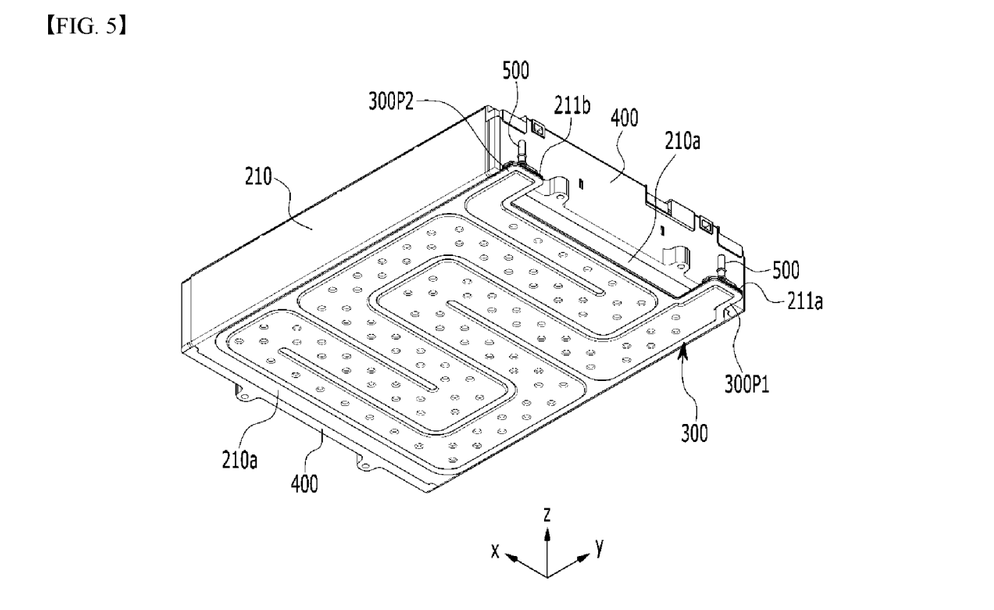
FIG. 5 is a perspective view of the battery module of FIG. 3 as viewed from bottom to top along the z-axis direction.

FIG. 5 is a perspective view of the battery module of FIG. 3 as viewed from bottom to top along the z-axis direction.

Referring to FIGS. 4 and 5, the bottom portion 210a of the module frame 200 constitutes an upper plate of the heat sink 300, and a recessed portion 340 of the heat sink 300 and the bottom portion 210a of the module frame 200 form a refrigerant flow passage.

Specifically, a heat sink 300 may be formed at a lower portion of the module frame 200, and the heat sink 300 may include a lower plate 310 that forms a skeleton of the heat sink 300 and is directly joined by welding or the like to the bottom portion 210a of the module frame 200, and a recessed part 340, which is a path through which the refrigerant flows. Further, the heat sink 300 may include a heat sink protrusion portion 300P that is protruded from one side of the heat sink 300 to the portion where the module frame protrusion portion 211 is located.

The heat sink protrusion portion 300P and the module frame protrusion portion 211 can be directly joined with each other by a method such as welding.

The recessed portion 340 of the heat sink 300 corresponds to a portion in which the lower plate 310 is formed to be recessed on the lower side. The recessed portion 340 may be a U-shaped tube in which a cross section cut perpendicularly to the xz plane with respect to the direction in which the refrigerant flow passage extends has U-shape, and the bottom portion 210a may be located on the opened upper side of the U-shaped tube. While the heat sink 300 comes into contact to with the bottom portion 210a, the space between the recessed portion 340 and the bottom portion 210a forms a region through which the refrigerant flows, that is, a flow passage of the refrigerant. Thereby, the bottom portion 210a of the module frame 200 can come into direct contact with the refrigerant.

The method of manufacturing the recessed portion 340 of the heat sink 300 is not particularly limited, but a U-shaped recessed portion 340 with an opened upper side can be formed by providing a structure formed to be recessed with respect to a plate-shaped heat sink 300.

The recessed portion 340 may be connected from one of the heat sink protrusion portions 300P to the other. The refrigerant supplied through a pack refrigerant supply pipe (not shown) and a refrigerant injection port 500a passes between the first module frame protrusion portion and the heat sink protrusion portion 300P, and first flows in the space between the recessed portion 340 and the bottom portion 210a. Thereafter, the refrigerant moves along the recessed portion 340, passes between the second module frame protrusion portion and the heat sink protrusion portion 300P, and is discharged through a refrigerant discharge port 500b and a pack refrigerant discharge tube (not shown).

Meanwhile, although not shown, a thermal conductive resin layer containing a thermal conductive resin may be located between the bottom portion 210a of the module frame 200 of FIG. 4 and the battery cell stack 120. The thermal conductive resin layer may be formed by applying a thermal conductive resin to the bottom portion 210a, and curing the applied thermal conductive resin.

The thermal conductive resin may include a thermal conductive adhesive material, and specifically, may include at least one of silicone material, urethane material, and acrylic material. The thermal conductive resin is a liquid during application but is cured after application, so that it can perform the role of fixing one or more battery cells 110 constituting the battery cell stack 120. Further, since the thermal conductive resin has excellent heat transfer properties, heat generated from the battery cell 110 can be quickly transferred to the lower side of the battery module.

The conventional battery module 10 shown in FIG. 2 is configured such that the heat generated from battery cells 11 passes through a thermal conductive resin layer 40, a bottom portion 31 of the module frame 30, a heat transfer member 50, and a refrigerant of a heat sink 60 in this order, and then is transferred to the outside of the battery module 10. In addition, the flow passage of the refrigerant of the heat sink 60 is located inside the heat sink 60.

On the other hand, the battery module 100 according to embodiments of the present disclosure can realize an integrated type cooling structure of the module frame 200 and the heat sink 300 to further improve cooling performance. The bottom portion 210a of the module frame 200 can perform the role of corresponding to the upper plate of the heat sink 300, thereby realizing the integrated type cooling structure. The cooling efficiency due to direct cooling can be increased, and through a structure in which the heat sink 300 is integrated with the bottom portion 210a of the module frame 200, the space utilization rate on the battery module and the battery pack equipped with the battery module can be further improved.

Specifically, the heat generated from the battery cell 110 can pass through a thermal conductive resin layer (not shown) located between the battery cell stack 120 and the bottom portion 210a, the bottom portion 210a of the module frame 200, and the refrigerant, and then can be transferred to the outside of the battery module 100. By removing the unnecessary cooling structure according to the conventional one, the heat transfer passage can be simplified and an air gap between respective layers can be reduced, so that the cooling efficiency or performance can be enhanced. In particular, since the bottom portion 210a is configured as an upper plate of the heat sink 300 and the bottom portion 210a comes into direct contact with the refrigerant, there is an advantage that more direct cooling through the refrigerant can be performed. This can be distinguished from a conventional structure in which as shown in FIG. 2, that is, the heat transfer member 50 and the upper configuration of the heat sink 60 are located between the bottom portion 31 and the refrigerant, which causes a reduction in the cooling efficiency.

Further, through the removal of the unnecessary cooling structure, the height of the battery module 100 is reduced and thus, the cost can be reduced and the space utilization rate can be increased. Furthermore, since the battery module 100 can be disposed in a compact manner, the capacity or output of the battery pack including a plurality of battery modules 100 can be increased.

Meanwhile, the bottom portion 210a of the module frame 200 can be joined by welding to a portion of the lower plate 310 in which the recessed portion 340 is not formed among the heat sink 300. In embodiments of the present disclosure, through the integrated type cooling structure of the bottom portion 210a of the module frame 200 and the heat sink 300, it can exhibit the effects of not only improving the cooling performance described above, but also supporting the load of the battery cell stack 120 housed in the module frame 200 and reinforcing the rigidity of the battery module 100. In addition, the lower plate 310 and the bottom portion 210a of the module frame 200 are sealed by welding or the like, so that the refrigerant can flow without leakage in the recessed portion 340 formed inside the lower plate 310.

For effective cooling, as shown in FIG. 5, the recessed portion 340 is preferably formed over most of the region corresponding to the bottom portion 210a of the module frame 200. For this purpose, the recessed portion 340 can be curved at least one time to connect from one side to another side. Meanwhile, the refrigerant is a medium for cooling and is not particularly limited, but it may be a cooling water.

Hereinafter, a heat sink contained in a battery module according to another embodiment of the present disclosure will be described in detail with reference to FIGS. 5 to 7.

Figure 6:
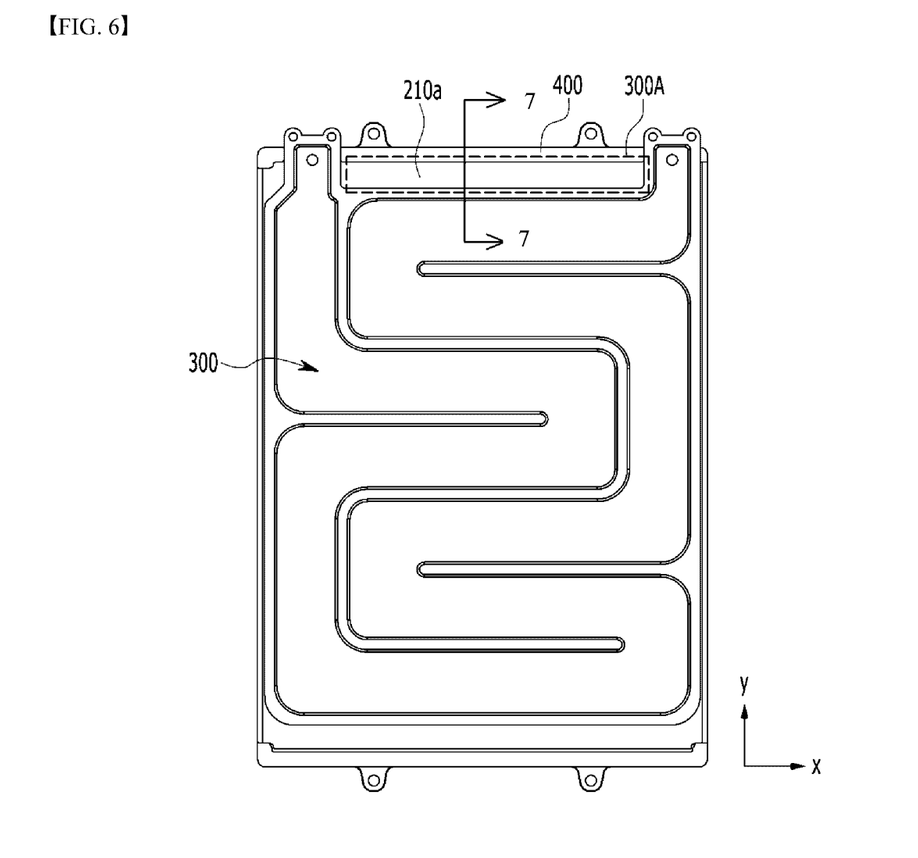
FIG. 6 is a diagram showing the battery module of FIG. 3 as viewed from bottom to top along the z-axis direction.

FIG. 6 is a diagram showing the battery module of FIG. 3 as viewed from bottom to top along the z-axis direction. FIG. 7 is a cross-sectional view taken along the cutting line 7-7 of FIG. 6.

Figure 7:
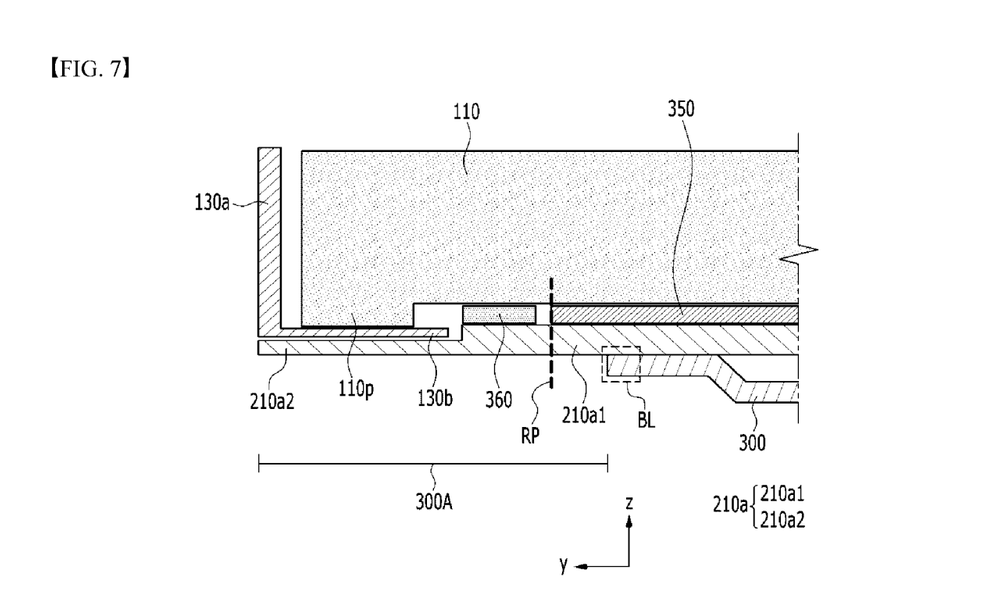
FIG. 7 is a cross-sectional view taken along the cutting line 7-7 of FIG. 6.

Referring to FIGS. 5 to 7, an avoidance portion 300A for exposing one end of the bottom portion 210a of the module frame 200 may be formed at one end of the heat sink 300. The avoidance portion 300A may be formed between a first module frame protrusion portion 211a and a second module frame protrusion portion 211b that are located so as to be separated from each other at one side of the module frame 200. The avoidance portion 300A may be formed between the first heat sink protrusion portion 300P1 corresponding to the first module frame protrusion portion 211a and a second heat sink protrusion 300P2 corresponding to the second module frame protrusion portion 211b. When viewed in a plan view from one side of the bottom portion 210a of the module frame 200, the avoidance portion 300A may be a region where one edge of the heat sink 300 retreats toward the central portion and the bottom part 210a of the module frame 200 is exposed. The avoidance portion 300A may be formed between the end plate 400 and one end of the heat sink 300.

Referring to FIG. 7, based on the direction (y-axis direction) perpendicular to the stacking direction of the plurality of battery cells 110, one end of the heat sink 300 that coincides with the boundary of the avoidance portion 300A may be disposed on the same line as the end of the thermal conductive resin layer 350 or inside the thermal conductive resin layer 350. In other words, the end of the thermal conductive resin layer 350 becomes the reference plane RP, and one end of the heat sink 300 according to embodiments of the present disclosure may be disposed on the same line as the reference plane RP or inside the reference plane RP. In addition, in the avoidance portion 300A, one end of the heat sink 300 and one end of the bottom portion 210a of the module frame 200 can be welded to form a welding line BL. The welding line BL may be formed so as to extend long in the stacking direction (x-axis direction) of the battery cells 110.

Figure 8:
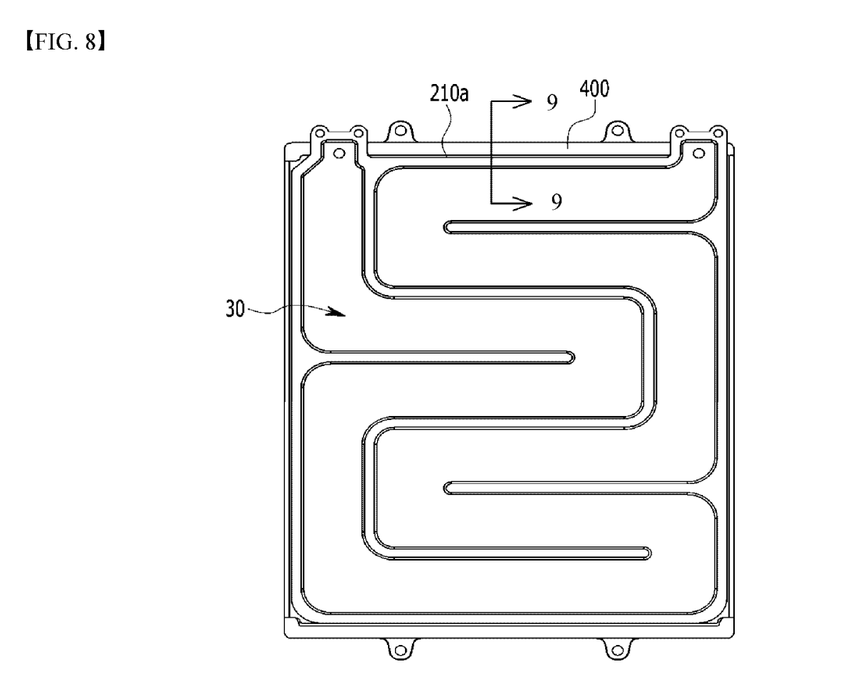
FIG. 8 is a diagram showing a heat sink of a battery module according to a comparative example.
Figure 9:
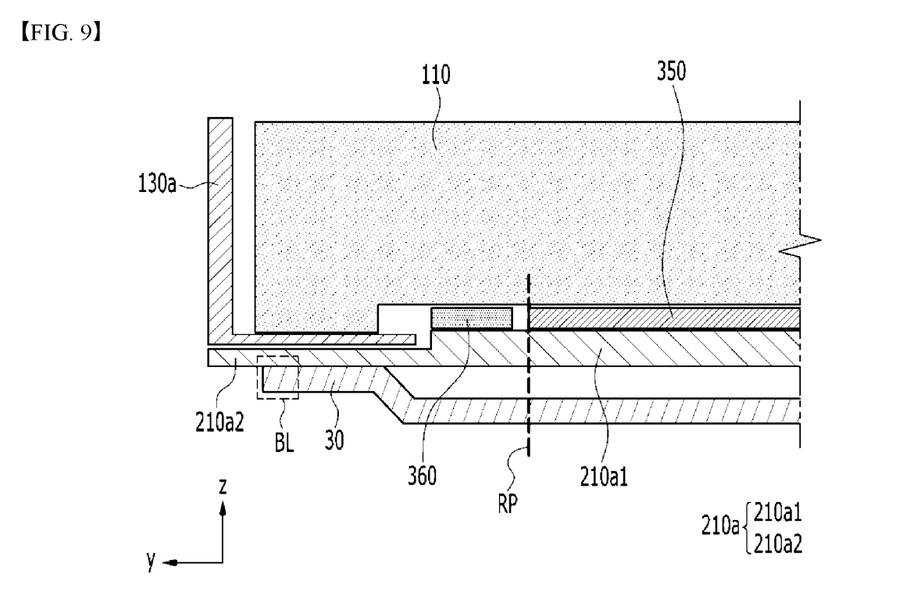
FIG. 9 is a cross-sectional view taken along the cutting line 9-9 of FIG. 8.

FIG. 8 is a diagram showing a heat sink of a battery module according to a comparative example. FIG. 9 is a cross-sectional view taken along the cutting line 9-9 of FIG. 8.

Referring to FIGS. 8 and 9, in the battery module according to the comparative example, one end of the heat sink 30 may be disposed outside the reference plane RP corresponding to the end of the thermal conductive resin layer 350, based on the direction (y-axis direction) perpendicular to the stacking direction of the plurality of battery cells 110.

Accordingly, the welding line BL formed by weld-joining between the one end of the heat sink 300 and the one end of the bottom portion 210a of the module frame 200 is formed in a region that does not overlap with the thermal conductive resin layer 350 for fixing the battery cell stack in which the battery cells 110 are stacked. Therefore, when vibration and impact occurs in the z-axis direction, excessive deformation may occur in the battery module. Due to this deformation, the junction between the heat sink 30 and the bottom portion 210a of the module frame 200 may be broken, and refrigerant leakage may occur, so the cooling performance can be reduced.

In contrast, according to embodiments of the present disclosure described with reference to FIGS. 6 and 7, the heat sink 300 and the module frame 200 are joined by welding or the like by avoiding a portion in which deformation occurs heavily in the bottom portion 210a of the module frame 200, which can thereby reduce the risk of damage due to vibration and impact. Accordingly, it is possible to by prevent refrigerant leakage, improve the cooling performance, and increase the stability of the battery module.

Referring back to FIG. 7, the bus bar frame according to embodiments of the present disclosure includes a main frame 130a and a support portion 130b extending from a lower portion of the main frame 130a. The bus bar frame is connected to the front and rear surfaces of the battery cell stack 120 of FIG. 4. The main frame 130a may form a structure in which electrode leads (not shown) protruding from the battery cell 110 pass through a slot and joined with a bus bar (not shown). The support portion 130b may be curved at about 90 degrees with respect to the main frame 130a and located on the bottom portion 210a of the lower frame 210.

The battery cell 110 according to embodiments of the present disclosure includes a protrusion portion 110p formed in the width direction, and the protrusion portion 110p is located on the support portion 130b. Here, the width direction of the battery cell 110 may be a direction opposite to the z-axis. The bottom portion 210a of the lower frame 210 according to embodiments of the present disclosure may include a first portion 210a1 in which the thermal conductive resin layer 350 is located, and a second portion 210a2 that is located more outside than the first portion 210a1 in the longitudinal direction (y-axis direction) of the battery cell stack 120. In other words, the second portion 210a2 is located at the edge with respect to the longitudinal direction of the battery cell 110, and the first portion 210a1 is located inside the second portion 210a2. In this case, the thickness of the second portion 210a2 may be thinner than the thickness of the first portion 210a1.

In this embodiment, the support portion 130b of the bus bar frame 130 is located on the second portion 210a2 of the bottom portion 210a of the lower frame 210. At this time, it is preferable that the sum of the thickness of the support portion 130b and the thickness of the second portion 210a2 is thinner than the thickness of the first portion 210a1. This is because it is possible to catch the protrusion portion 110p of the battery cell 110 by a step difference between the second portion 210a2 and the first portion 210a1 and prevent the protrusion portion 110p of the battery cell 110 from moving due to an external impact. In addition, it is possible to reduce the gap between the battery cell 110 and the frame through the processing of the bottom portion 210a of the lower frame 210. This gap-reducing effect creates a synergistic effect with the gap-reducing effect that can be obtained through height direction assembly, thereby maximizing overall space efficiency. The processing of the bottom portion 210a of the lower frame 210 may form a lower frame structure and simultaneously form a step difference of the bottom portion 210a. Press molding or NC (numerical control work) processing may be used to form such a step difference.

A pad portion 360 is located between the first portion 210a1 of the bottom portion 210a and the battery cell 110, and the thermal conductive resin layer 350 is located inside the pad portion 360. That is, the pad portion 360 may be located between the thermal conductive resin layer 350 and the second part 210a2 of the bottom part 210a to define a position where the thermal conductive resin layer 350 is formed.

Meanwhile, one or more of the battery modules according to embodiments of the present disclosure described above can be mounted together with various control and protection systems such as a battery management system (BMS) and a cooling system to form a battery pack.

The battery module or the battery pack including the same as described above can be applied to various devices. These devices can be applied to vehicle means such as an electric bike, an electric vehicle, and a hybrid electric vehicle, but the present disclosure is not limited thereto and can be applied to various devices capable of using a battery module and a battery pack including the same, which also falls under the scope the present disclosure.

Although preferred embodiments of the present disclosure have been described above, but the scope of the present disclosure is not limited thereto, and modifications and improvements made by those skilled in the part by using the basic concept of the present disclosure, which are defined in the following claims, also belong to the scope of the present disclosure.

DESCRIPTION OF REFERENCE NUMERALS

100: battery module
211: module frame protrusion portion
300: heat sink
300A: avoidance portion
300P: heat sink protrusion portion
350: thermal conductive resin layer

The invention claimed is:

1. A battery module comprising:
a battery cell stack in which a plurality of battery cells are stacked in a stacking direction;
a module frame for housing the battery cell stack, the module frame including a bottom portion;
a thermal conductive resin layer located between the bottom portion of the module frame and the battery cell stack; and
a heat sink located below the bottom portion of the module frame,
wherein the bottom portion of the module frame forms an upper plate attached to the heat sink, and
wherein an avoidance portion of the module frame is formed at one end of the heat sink, the avoidance portion being an exposed portion of the bottom portion of the module frame not covered by the heat sink.

2. The battery module of claim 1, wherein:
based on a direction perpendicular to the stacking direction of the plurality of battery cells, one end of the heat sink that coincides with the boundary of the avoidance portion is disposed on a same line as an end of the thermal conductive resin layer or inside the thermal conductive resin layer.

3. The battery module of claim 2, wherein:
a recessed portion of the heat sink and the bottom portion of the module frame form a refrigerant flow passage, and
the bottom portion of the module frame contacts a refrigerant flowing in the refrigerant flow passage.

4. The battery module of claim 2, wherein:
in the avoidance portion, one end of the heat sink and one end of the bottom portion of the module frame are joined by welding, and
wherein a welding line is formed by weld-joining in the stacking direction of the battery cells.

5. The battery module of claim 1, wherein:
the module frame comprises a module frame protrusion portion formed by protruding a part of the bottom portion of the module frame.

6. The battery module of claim 5, wherein:
the heat sink comprises a heat sink protrusion portion that protrudes from one side of the heat sink to a portion where the module frame protrusion portion is located.

7. The battery module of claim 6, wherein:
the battery module further comprises a first end plate for covering a front surface of the battery cell stack and a second end plate for covering a rear surface of the battery cell stack, and
the module frame protrusion portion is extended and formed so as to pass through the first end plate.

8. The battery module of claim 7, wherein:
the module frame protrusion portion comprises a first module frame protrusion portion and a second module frame protrusion portion that are located so as to be separated from each other at one side of the module frame, and
the avoidance portion is formed between the first module frame protrusion portion and the second module frame protrusion portion.

9. The battery module of claim 8, wherein:
the avoidance portion for exposing one end of the bottom portion of the module frame is formed between the first end plate and one end of the heat sink.

10. The battery module of claim 1, wherein:
the module frame comprises a lower frame that covers a lower portion and both side portions of the battery cell stack, and an upper plate that covers an upper portion of the battery cell stack,
the lower frame comprises a bottom portion and two side portions facing each other,
the bottom portion comprises a first portion and a second portion,
the thermal conductive resin layer is disposed in the first portion, the second portion is located at the edge with respect to a longitudinal direction of the battery cell, and a thickness of the second portion is thinner than a thickness of the first portion.

11. The battery module of claim 10, wherein:
the battery module further comprises a pad portion located between the first portion and the battery cell stack, and the pad portion is located between the thermal conductive resin layer and the second portion.

12. The battery module of claim 1, wherein:
a protrusion pattern protruding toward the bottom portion of the module frame is formed inside the heat sink.

13. A battery pack comprising the battery module of claim 1.

14. The battery module of claim 1, further comprising:
a module frame protrusion portion at a front edge of the module frame;

a heat sink protrusion portion at a front edge of the heat sink,
wherein the avoidance portion is formed between the front edge of the module frame and the front edge of the heat sink.

15. The battery module of claim 14, wherein the module frame protrusion portion comprises a first module frame protrusion portion and a second module frame protrusion portion,
wherein the avoidance portion is formed between the first module frame protrusion portion and a second module frame protrusion portion.

* * * * *